(12) United States Patent
Parsoneault et al.

(10) Patent No.: US 7,726,882 B2
(45) Date of Patent: Jun. 1, 2010

(54) DUAL SEAL FOR OPTIMIZED PERFORMANCE

(75) Inventors: Norbert S. Parsoneault, Scotts Valley, CA (US); Robert Alan Nottingham, Santa Cruz, CA (US); Alexander Parkhomovsky, San Jose, CA (US); Robert M. Pelstring, Santa Cruz, CA (US); Jeffry Arnold Leblanc, Aptos, CA (US); Troy Michael Herndon, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 721 days.

(21) Appl. No.: 11/588,258

(22) Filed: Oct. 27, 2006

(65) Prior Publication Data

US 2008/0101738 A1 May 1, 2008

(51) Int. Cl.
*F16C 33/72* (2006.01)
*F16C 32/06* (2006.01)

(52) U.S. Cl. .................................... 384/132; 384/119
(58) Field of Classification Search ................. 384/100, 384/107–124, 130, 132; 310/90
See application file for complete search history.

(56) References Cited

U.S. PATENT DOCUMENTS

| | | | | |
|---|---|---|---|---|
| 3,778,123 A | * | 12/1973 | Hendler et al. | 384/132 |
| 5,246,294 A | * | 9/1993 | Pan | 384/119 |
| 5,558,443 A | * | 9/1996 | Zang | 384/112 |
| 5,558,445 A | * | 9/1996 | Chen et al. | 384/132 |
| 5,997,179 A | * | 12/1999 | Khan et al. | 384/107 |
| 6,296,391 B1 | * | 10/2001 | Hayakawa et al. | 384/119 |
| 6,669,369 B1 | | 12/2003 | Nottingham et al. | |
| 2008/0101738 A1 | | 5/2008 | Parsoneault et al. | |

* cited by examiner

*Primary Examiner*—Thomas R Hannon

(57) ABSTRACT

A fluid dynamic bearing having a hub, a sleeve, and a sealing arrangement comprising a first capillary seal substantially retaining a first fluid and a second capillary seal comprising a second fluid. The second capillary seal is located between the first capillary seal and an opening between the hub and the sleeve.

22 Claims, 5 Drawing Sheets

DUAL SEAL FOR OPTIMIZED PERFORMANCE

FIELD OF INVENTION

The present invention relates generally to an improved sealing arrangement for a fluid bearing. This invention relates more specifically to a dual seal arrangement for a fluid dynamic bearing in a disc drive spindle motor.

BACKGROUND

Magnetic discs with magnetizable media are used for data storage in most computer systems. Current magnetic hard disc drives operate with the read-write heads only a few nanometers above the disc surface and at rather high speeds, typically a few meters per second.

Generally, the discs are mounted on a spindle that is turned by a spindle motor to pass the surfaces of the discs under the read/write heads. Spindle motors generally include a shaft, a base plate, a sleeve, and a hub. The shaft may be separate from and attached to the hub or incorporated in the hub. The shaft and the sleeve rotate relative to each other. Either the shaft rotates and the sleeve remains stationary, or vice versa. Permanent magnets attached to the hub interact with a stator winding on the base plate to rotate the shaft or the sleeve. To facilitate relative rotation of the shaft and the sleeve, one or more bearings are usually disposed between the shaft and the sleeve.

FIG. 1 shows a schematic of a magnetic disc drive with a spindle motor that commonly utilizes a fluid dynamic bearing. Fluid bearings use a thin layer of liquid or gas fluid between the bearing faces. Referring to FIG. 1, a disc drive typically includes a housing having a base sealed to a cover with a seal. The disc drive has a spindle to which are attached one or more discs having surfaces covered with a magnetic media (not shown) for magnetically storing information. A spindle motor (not shown in this figure) rotates the discs past read/write heads, which are suspended above surfaces of the discs by a suspension arm assembly. In operation, the spindle motor rotates the discs at high speed past the read/write heads while the suspension arm assembly moves and positions the read/write heads over one of a several radially spaced tracks (not shown). This allows the read/write heads to read and write magnetically encoded information to the magnetic media from and to the surfaces of the discs at selected locations.

As illustrated in the spindle motor embodiment of FIG. 2, spindle motors can include a shaft having an outer surface that abuts a sleeve. The shaft rotates relative to the sleeve or vice versa. In this embodiment, the shaft is separate from the hub; however, the hub and shaft may have a one-piece construction.

Fluid dynamic bearings are commonly located between the hub/shaft (which refers to a one-piece hub-shaft embodiment and an embodiment with separate hub and shaft) and the sleeve of the motor, which typically move relative to each other. The fluid used in the bearing is commonly an oil, and fluid type choices are usually based on the fluid's viscosity, as well as its equilibrium vapor pressure and the coefficient of gas phase diffusion. The fluid is also referred to herein as lubricant. Fluid dynamic bearing designs are known to use a capillary seal to contain a volume of lubricant necessary for continuous and proper motor operation. FIG. 3 illustrates a vertical cross section of a prior art spindle motor having a fluid dynamic bearing with a capillary seal. This spindle motor embodiment includes a one-piece hub and shaft. Typical bearings lubricants are optimized to have lower viscosity, which decreases motor power consumption and enhances motor performance. In addition, the lubricant preferably has a low equilibrium vapor pressure to reduce fluid loss by evaporation. However, lower viscosity lubricating fluids typically have higher vapor pressure that results in a substantial amount of lubricant being lost from the capillary seal by evaporation and oil vapor diffusion in the gas phase over the life of the motor.

To compensate for lubricant loss, capillary seal are often designed to hold a larger amount of lubricating fluid. The available reservoir volume is, however, limited by motor size constraints and requirements for seal splash robustness during shock events. It is advantageous to minimize the amount of fluid that evaporates from the capillary seal over the life of the motor. This is preferably done without negatively affecting spindle motor performance afforded by low viscosity fluids.

SUMMARY OF THE INVENTION

This invention relates to a fluid dynamic bearing having a hub, a sleeve, and a sealing arrangement comprising a first capillary seal substantially retaining a first fluid and a second capillary seal comprising a second fluid. The second capillary seal is located between the first capillary seal and an opening between the hub and the sleeve.

This invention also relates to a spindle motor having a fluid dynamic bearing including a sealing arrangement. The spindle motor comprises a sleeve and a hub. One of the sleeve and the hub rotate relative to the other. The spindle motor also comprises a first fluid disposed between the hub and the sleeve, a first capillary seal substantially retaining the first fluid and a second capillary seal comprising a second fluid and located between the first capillary seal and an opening between the hub and the sleeve. The sleeve includes a protrusion and the second capillary seal is formed at the protrusion.

This invention further relates to a method for sealing a fluid dynamic bearing. The method comprises filling the fluid dynamic bearing with a first fluid retained by a first capillary seal and forming a second capillary seal between the first capillary seal and an opening between the hub and the sleeve. The second capillary seal comprises a second fluid.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

In the following detailed description, "a" and "an" refer to one or more. The following description is presented to enable a person of ordinary skill in the art to make and use various aspects and embodiments of the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention.

Figure 3:
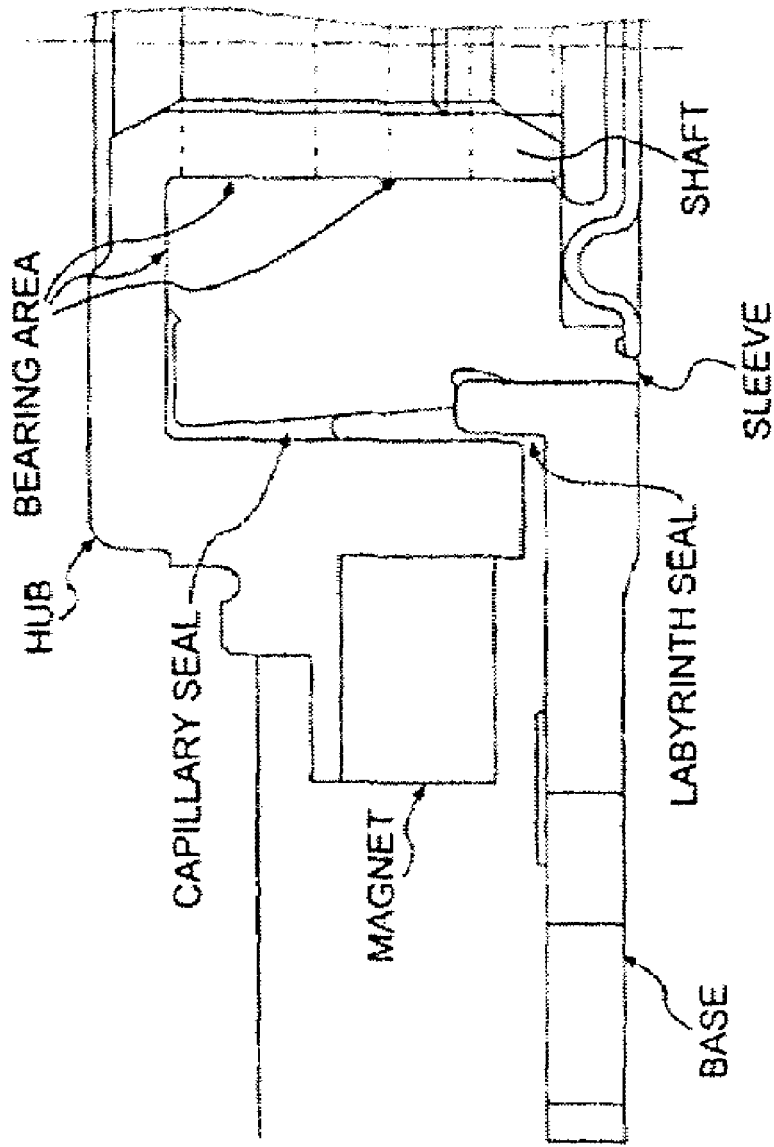
FIG. 3 illustrates a vertical cross section of a prior art a spindle motor having a fluid dynamic bearing with a capillary seal.

The present invention contemplates a spindle motor utilizing two capillary seals having different fluids. One of the fluids is optimized for low evaporation rate, while the other is optimized for lubrication and maximizing spindle motor performance. Lubricant loss in capillary-sealed fluid dynamic bearings occurs by evaporation of fluid molecules from the capillary seal and diffusion of those fluid molecules through a gap such as a labyrinth seal (see FIG. 3). The rate of lubricant loss is generally proportional to the exposed surface area available for diffusion and the evaporation rate of the fluid. By decreasing the exposed surface area of lubricant and utilizing a fluid with low evaporation rate, the present invention decreases lubricant loss in the fluid dynamic bearing of a spindle motor.

Figure 4:
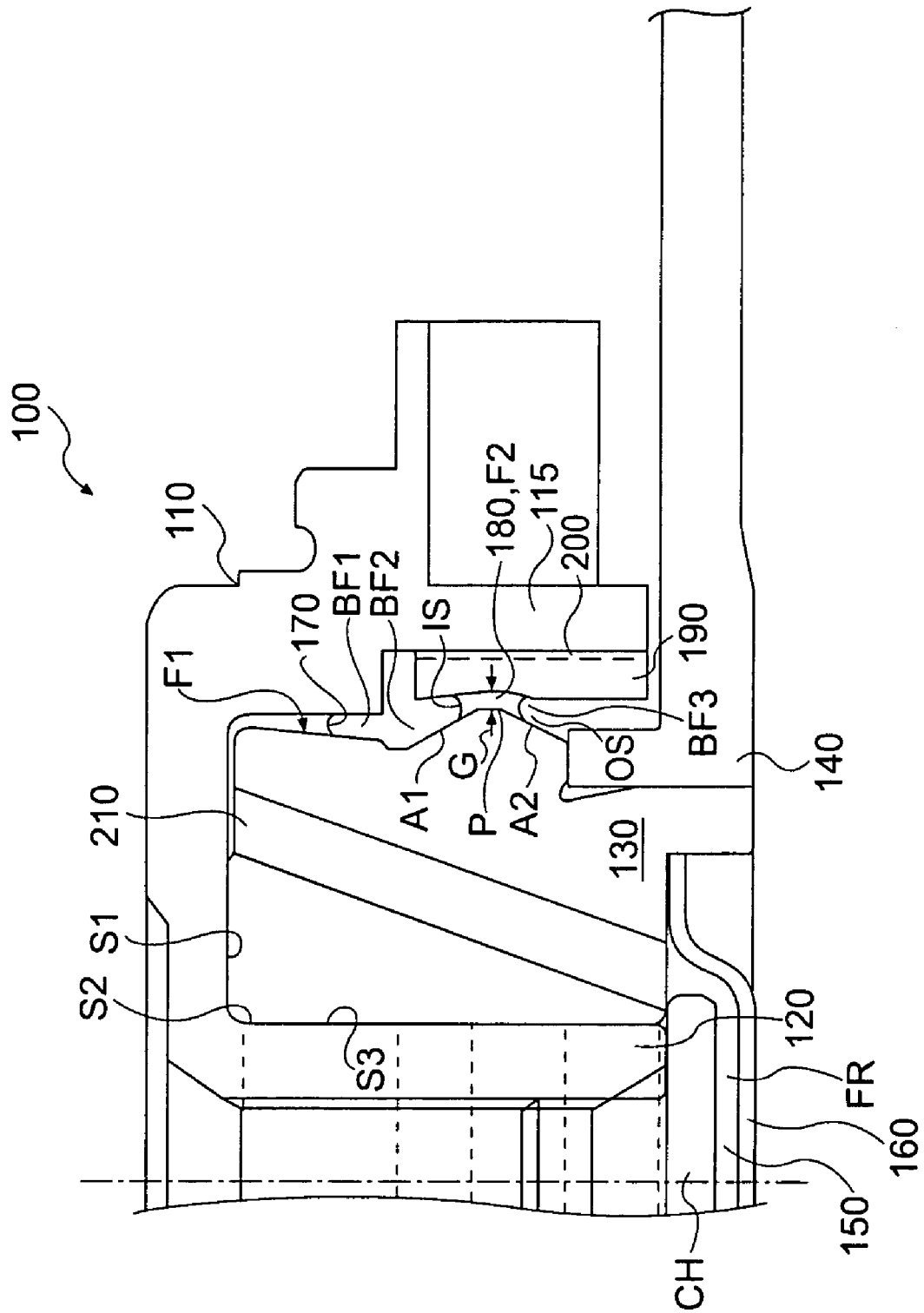
FIG. 4 illustrates a vertical cross section of an embodiment of a spindle motor having a bearing in accordance with the present invention.

FIG. 4 illustrates a vertical cross section of an embodiment of a spindle motor 100 having a fluid dynamic bearing in accordance with the present invention. As can be seen, the spindle motor 100 includes a hub 110 that includes a shaft 120. The spindle motor 100 also includes a sleeve 130 that is fixedly attached to a base 140. The sleeve 130 is adjacent multiple surfaces of the hub 110 and its shaft, including a surface S1 along the top of the sleeve 130, a surface S2 at a corner of the sleeve 130, and a surface S3 along an inner diameter of the sleeve 130. To facilitate relative movement between the rotating sleeve 130 and the stationary hub 110/shaft 120, bearing fluid F1 is provided at least along surfaces S1, S2, and S3. In this rotating shaft embodiment, an optional limiter 150 is attached to the shaft 120 of the hub, preferably at its inner diameter. In the illustrated embodiment, the limiter 150 threads or is otherwise attached to a center hole CH of the shaft 120 to keep the hub 110/shaft 120 inside of the sleeve 130 during a shock to the spindle motor 100. The hub 110/shaft 120, and the limiter 150 rotate together, while the sleeve 130 remains stationary and fixed to the base 140.

Figure 1:
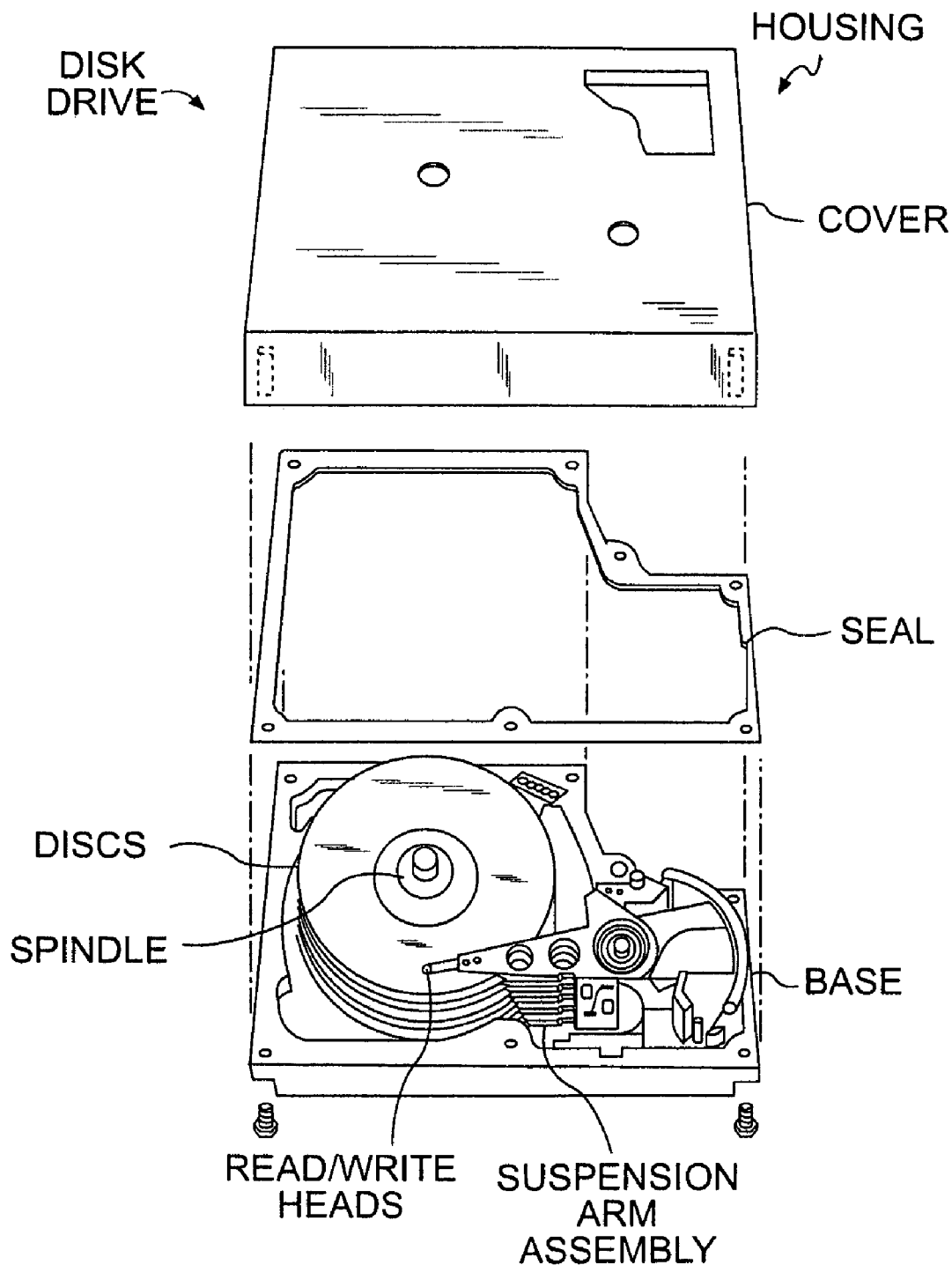
FIG. 1 illustrates schematically a magnetic disc drive.
Figure 2:
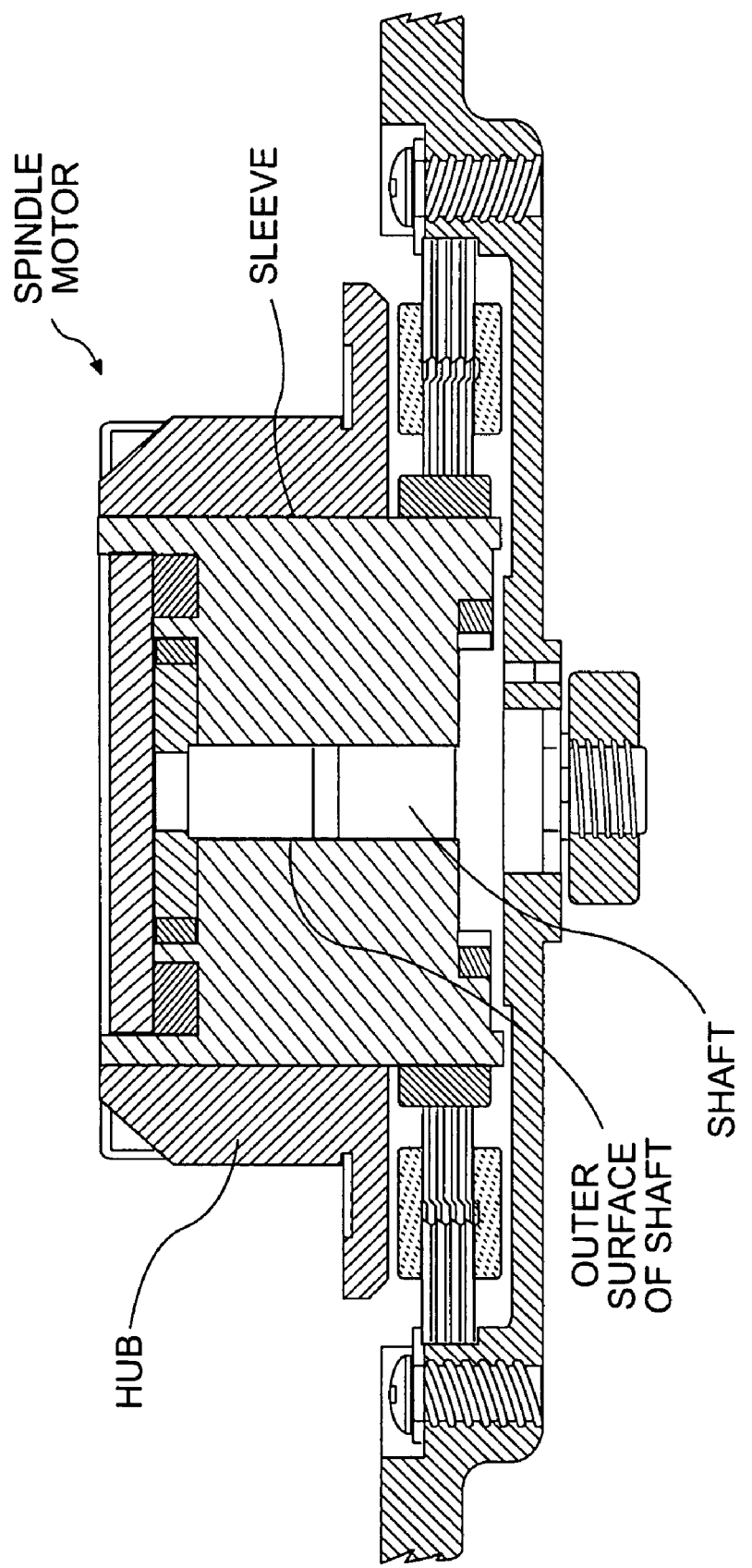
FIG. 2 illustrates a vertical cross section of a spindle motor for a spindle as shown in FIG. 1.

The spindle motor 100 may additionally include a shield 160 that seals a bottom of the sleeve 130 to prevent leakage of fluid from the fluid dynamic bearing. The shield 160 remains stationary with the sleeve 130 and the base 140 as the hub 110/shaft 120 rotate. Although the embodiment of FIG. 4 includes a one-piece hub and shaft, the present invention contemplates utilizing a dual seal for spindle motors of other known designs, such as those with a separate shaft and hub (as illustrated in prior art FIG. 2).

The fluid dynamic bearing of the present invention includes two capillary seals to prevent fluid leakage and evaporation. A first capillary seal 170 is located between the sleeve 130 and the hub 110. The first capillary seal 170 retains a fluid F1 optimized for lubrication, such as a fluid with lower viscosity to decrease motor power consumption and enhance motor performance. This fluid F1 extends along the surfaces S1, S2, and S3 of the sleeve 130 to lubricate the relatively-moving parts of the spindle motor 100.

A second seal capillary seal 180 is also provided and preferably includes a fluid F2 optimized for low evaporation rate. In a preferred embodiment of the invention, the surface area of the second capillary seal 180 is minimized to prevent evaporation of fluid F1 from the bearing. Minimizing the surface area of the second capillary seal 180 is desirable because the low-evaporation-rate fluid in the second capillary seal 180 generally has a higher viscosity and therefore can tend to decrease motor performance.

Figure 5:
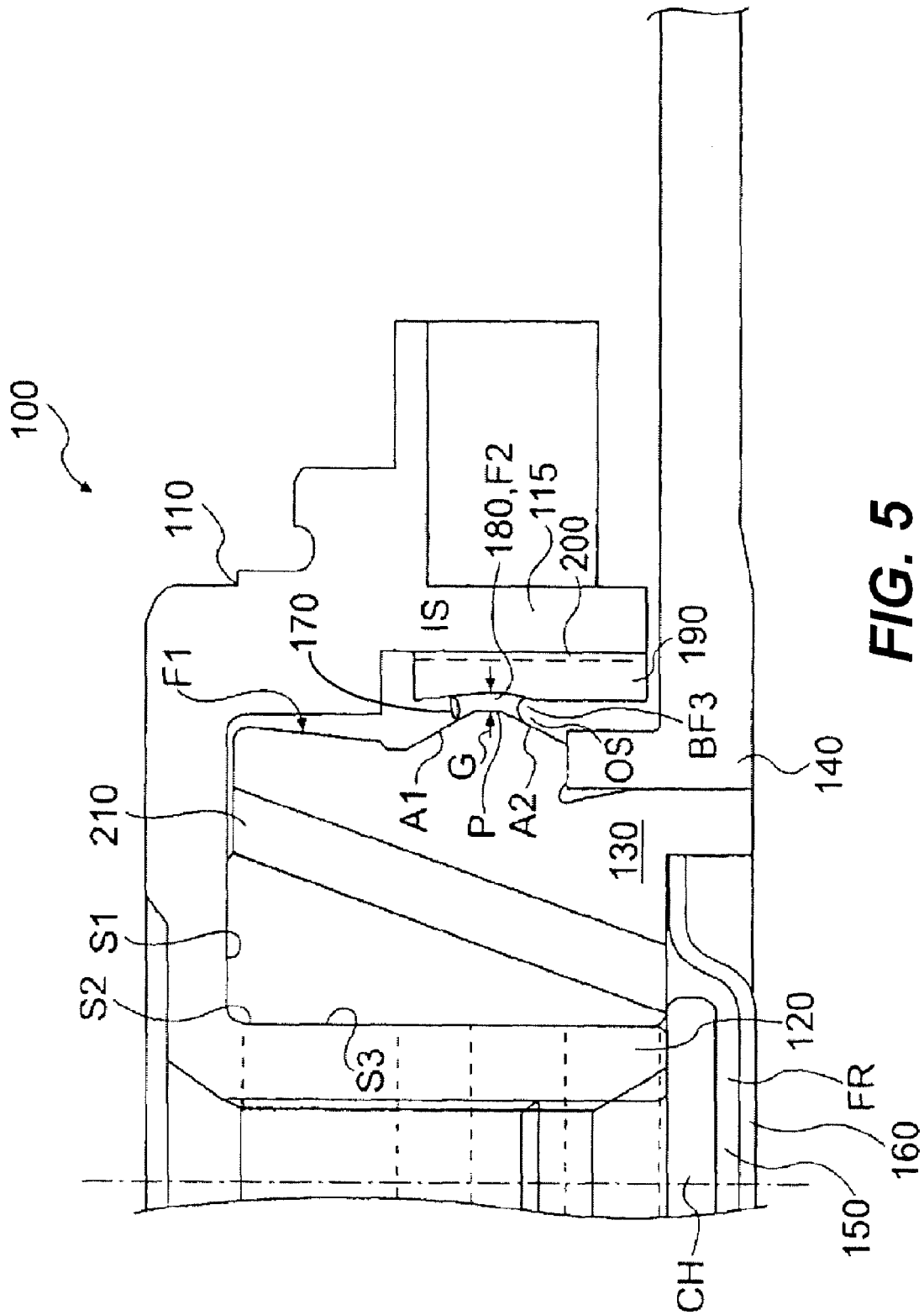
FIG. 5 illustrates a vertical cross section of another embodiment of a spindle motor having a bearing in accordance with the present invention.

As can be seen, in the illustrated embodiment of the invention, the second capillary seal 180 extends between a protruding portion P of the sleeve 130 and an insert 190 attached to a vertical wall 115 of the hub 110. The second capillary seal 180 includes an inner surface IS and an outer surface OS. In one embodiment, inner surface IS of second capillary seal 180 is in contact with first capillary seal 170, as shown in FIG. 5. A vent 200 is preferably provided and ensures that the second capillary seal 180 has substantially equivalent pressure on both of its exposed surfaces IS, OS. This substantially equivalent pressure allows the second capillary seal 180 to function properly.

A capillary seal is essentially a type of seal in which the fluid is kept in place by capillary forces, and requires a relatively tight gap having a convergence. Capillary forces are proportional to the gap width, and must exceed gravity to hold the fluid. Therefore, the protruding portion P of the sleeve 130 allows formation of the second capillary seal 180 by providing both a tight gap G and two areas of convergence A1, A2.

In accordance with the invention, a low evaporation fluid in the second capillary seal 180 allows use of a high performance fluid in the spindle motor's fluid dynamic bearing while minimizing evaporation of the high performance fluid from the first capillary seal 170. The second capillary seal 180 thus functions as a plug to prevent evaporation of fluid F1 from the first capillary seal 170.

Fluid F1 in the bearing circulates within the bearing to prevent sub-ambient pressure. This is because the taper of journal bearings causes bearing fluid to flow toward the cap seal and the motor tries to pump the fluid out, creating negative pressure at the bottom of the shaft. In the illustrated embodiment of the invention, the fluid circulates within the bearing along surfaces S1, S2, and S3, to lubricate relatively moving parts of the spindle motor 100. The fluid also circulates along an outer surface of the sleeve 130 between the sleeve 130 and the hub 110, and through a recirculation hole 210 that preferably extends through the sleeve 130 to a fluid reservoir FR containing the high performance fluid F1. The recirculation hole 210 allows the fluid to flow between the bottom of the shaft 120 and the end of the first capillary seal 170.

In a preferred embodiment of the invention, the fluids F1 and F2 are not in communication. This may be achieved by the fluids being spatially separated, but may also be achieved by placing a barrier film (not shown) between the first capillary seal 170 and the second capillary seal 180. The barrier film can be placed, for example, at location BF1 or BF2. In addition, a barrier film can optionally be used along an exterior of the second capillary seal 180 at, for example, location BF3. A barrier film located at BF1, BF2, or BF3 could further decrease evaporation of fluid from the fluid dynamic bearing.

After filling the bearing with appropriate fluids, the low vapor pressure fluid in the second capillary seal 180 will serve as a barrier to lubricant molecule diffusion from the first capillary seal 170, with the overall rate of evaporation for the bearing being determined by the rate of evaporation of the low vapor pressure fluid in the second capillary seal 180. Thus, using two capillary seals can extend the useful life and improve performance of a spindle motor by retaining an optimal performance fluid in the fluid dynamic bearing for a longer period of time.

It is to be understood that the present invention also contemplates providing a fluid dynamic bearing for a spindle motor having a fixed shaft and a rotating sleeve. In addition, the protrusion P can have a variety of shapes and locations, as long as a suitable capillary seal can be formed. The present invention contemplates a second capillary seal that is formed directly between the sleeve and the hub, without need for an insert as shown in FIG. 4.

The invention claimed is:

1. A fluid dynamic bearing including a hub, a sleeve, and a sealing arrangement comprising:
    a first capillary seal substantially retaining a first fluid; and
    a second capillary seal comprising a second fluid and located between the first capillary seal and an opening at a protrusion between the hub and the sleeve.

2. The fluid dynamic bearing of claim 1, wherein the first fluid is different than the second fluid.

3. The fluid dynamic bearing of claim 1, wherein the first fluid comprises a lubricant.

4. The fluid dynamic bearing of claim 1, wherein the second fluid has a lower evaporation rate than the first fluid.

5. The fluid dynamic bearing of claim 1, wherein the second capillary seal acts as a plug to prevent evaporation of the first fluid.

6. The fluid dynamic bearing of claim 1, further comprising an insert attached to a wall of the hub, the insert having a vent therethrough.

7. The fluid dynamic bearing of claim 1, wherein the protrusion extends from the sleeve.

8. A spindle motor having a fluid dynamic bearing including a sealing arrangement, comprising:
    a sleeve and a hub, wherein one of the sleeve and the hub rotate relative to the other;
    a first fluid disposed between the hub and the sleeve;
    a first capillary seal substantially retaining the first fluid; and
    a second capillary seal comprising a second fluid and located between the first capillary seal and an opening between the hub and the sleeve, wherein the sleeve includes a protrusion and the second capillary seal is formed at the protrusion.

9. The spindle motor of claim 8, wherein the spindle motor further comprises an insert attached to a wall of the hub, the insert having a vent therethrough.

10. The spindle motor of claim 8, wherein an insert is attached to the hub and the second capillary seal is formed between the protrusion and the insert.

11. The spindle motor of claim 10, wherein the second capillary seal has an inner surface and an outer surface, the insert comprising a vent providing substantially equivalent pressure on the inner and outer surfaces of the second capillary seal.

12. The spindle motor of claim 8, wherein the first fluid is different than the second fluid.

13. The spindle motor of claim 8, wherein the first fluid comprises a lubricant.

14. The spindle motor of claim 8, wherein the second fluid has a lower evaporation rate than the first fluid.

15. The spindle motor of claim 8 wherein the second capillary seal acts as a plug to prevent evaporation of the first fluid.

16. A method for sealing a fluid dynamic bearing, the method comprising:
    filling the fluid dynamic bearing with a first fluid retained by a first capillary seal; and
    forming a second capillary seal at a protrusion between a hub and a sleeve, the second capillary seal being positioned between the first capillary seal and an opening in the fluid dynamic bearing, the second capillary seal comprising a second fluid.

17. The method of claim 16, wherein the first fluid is different than the second fluid.

18. The method of claim 16, wherein the first fluid comprises a lubricant.

19. The method of claim 16, wherein the second fluid has a lower evaporation rate than the first fluid.

20. The method of claim 16, wherein the second capillary seal acts as a plug to prevent evaporation of the first fluid.

21. The method of claim 16, wherein the second capillary seal has an inner surface and an outer surface, the inner surface contacting the first capillary seal.

22. The method of claim 16, wherein the protrusion extends from the sleeve.

* * * * *